United States Patent

[11] 3,618,951

| [72] | Inventors | Gerald H. Parrick, III<br>5424 Corteen Pl., Apt. 26;<br>Gerald G. Clodfelter, 4657 Kraft Ave.,<br>both of North Hollywood, Calif. 91602 |
|---|---|---|
| [21] | Appl. No. | 832,409 |
| [22] | Filed | June 11, 1969 |
| [45] | Patented | Nov. 9, 1971 |

[54] APPARATUS FOR PLAYING A BINGOLIKE GAME
15 Claims, 5 Drawing Figs.

[52] U.S. Cl. ................................................ 273/135 B,
273/136 R
[51] Int. Cl. ................................................ A63f 3/00
[50] Field of Search .......................................... 273/130,
135, 153

[56] References Cited
UNITED STATES PATENTS
1,521,095  12/1924  Harris ........................... 273/135
1,871,247  8/1932  Trost ............................ 273/135
3,393,914  7/1968  Hill ............................. 273/135
3,441,280  4/1969  Eggermont ..................... 273/135

*Primary Examiner*—Delbert B. Lowe
*Attorney*—Allan M. Shapiro

ABSTRACT: A game board delineated by horizontal and vertical lines into a plurality of columns and rows to define vacant spaces, the lowermost horizontal line being heavier than the others, a plurality of number-carrying tokens, each carrying a different number and totaling the number of rows minus one on the game board times the number of columns on the game board, and a random number selector having a plurality of different numbers thereon, with the lowest number being larger than the highest number on the number tokens. In species for plural players, a plurality of game boards overlap so that some of the spaces on the board of one player are in common with spaces on the board of another player.

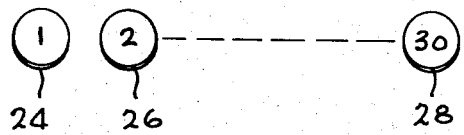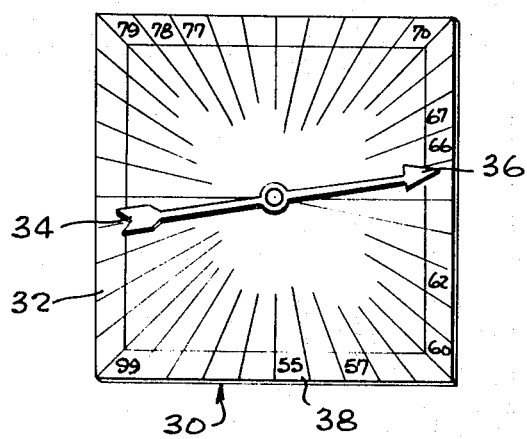

Fig. 5

APPARATUS FOR PLAYING A BINGOLIKE GAME

BACKGROUND OF THE INVENTION

1. Field of the Invention

The game comprises a game board divided into a plurality of spaces arranged so that the spaces are in columns and rows, a plurality of number-carrying means, each having a different number thereon, and a random number selector means.

2. Description of the Prior Art

The prior art falls into two categories. The first category comprises bingo like games wherein the player has a card having rows and columns thereon, to define a plurality of spaces. Each of these spaces has a number printed therein. As the leader of the game calls these numbers in random order, the player of the game marks those numbers he finds on his card. When the player completes a row or column or diagonal of such markings, and he is the first to do so, he is winner of the game.

The game of bingo is characterized by the fact that the numbers are already placed on the card, and thus the player employs no skill in the choosing of numbers or the placement of numbers. It is also characterized by the fact that there are more numbers employed in playing the total game than there are spaces on an individual card. Accordingly, when the calling of numbers is by random chance by the game leader, no skill is employed by the player, other than merely listening and marking his card when he hears one of his numbers called.

In another class of numerical board games, rows and columns are delineated to form related spaces. The player has available to him a plurality of numbers and/or other mathematical symbols. Usually some information is preprinted upon the board, either in some of the spaces or along the edges. The player then employs his numbers and/or symbols to form equations. Sometime an opponent plays upon the same board and employs numbers or indicia already placed on the board by the first player, so that the opponent can form his own equations for his scoring. In such games, the players have a plurality of numbers and/or indicia from which they can select before acting. Accordingly, the player has freedom of both which indicia to employ and the space in which it is to be employed, but is limited by what is already in one of the adjacent spaces.

SUMMARY OF THE INVENTION

In order to aid in the understanding of this invention, it can be stated in essentially summary form that it is directed to a game employing a game board which has rows and columns thereon to form a plurality of spaces, a plurality of number-carrying tokens each having a different number thereon and the total number of tokens being equal to the number of rows minus one on the gameboard times the number of columns, and a random number-selecting device. The random number selecting device selects numbers for placement in the bottom or total row, and the numbers carried by the number means are successively placed in spaces so that a column of numbers equals its total at the bottom.

Accordingly, it is an object of this invention to provide a game of skill which employs a board having a plurality of spaces thereon, and wherein the player places numbers obtained by him at random in spaces in accordance with his own judgment so that the player can strive to reach a known total. It is another object to employ a game board with a plurality of spaces arranged in lines and columns wherein the columns have totals at the bottom thereof during play, and during play the player arranges numbers obtained by him at random in the spaces in an attempt to reach the columnar totals. It is still another object to provide a game of skill wherein a random number selector selects numbers for the bottoms of the columns. It is still another object to provide a game of skill wherein the player competes against himself in successive games, or jointly with one or more other players wherein the player competes against at least one of the other players.

It is a further object to provide a game of skill which includes a game board having a means delineating rows and columns to define a plurality of spaces, the bottom most row providing a total space at the bottom of each column. It is still another object to provide number means in association with such a game board wherein the number means each carries a different number, and the total number of number means equals the number of rows minus one on the game board times the number of columns so that there is one number means for each of the spaces above the total spaces. It is still another object to provide random number-selecting means to randomly select total numbers to be placed in the bottommost total space in each column. Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a view of a game board portion of the invention suitable for individual play of the game of skill.

FIG. 2 is a view of several of a plurality of number tokens which form a part of the game of skill in accordance with this invention.

FIG. 3 is a plan view of a random number selector which forms a part of the game in accordance with this invention.

FIG. 4 is a view of a game board portion of the invention particularly arranged for play of the game of skill by two opponents.

FIG. 5 is a view of a game board portion of the invention particularly suited for four players of the game.

DESCRIPTION OF THE PREFERRED EMBODIMENTS

FIG. 1 illustrates the preferred, but exemplary game board at 10. Game board 10 is preferably of substantially planar material, and may be of paper, cardboard or synthetic polymer composition material. When of paper, the game board can be padded so that the plurality of such game boards are arranged in pad form so that individual game boards can be disposed of after use. On the other hand, when the material of game board 10 is heavier, it can be arranged for reuse so that it need not be destroyed or disposed of after each game. Game board 10 has a plurality of longitudinal markings 12 which divide the game board into a plurality of lateral markings 16 which divide the board into a plurality of rows 18. The markings 12 and 16 intersect each other to define a plurality of spaces 20. The lowermost lateral marking, indicated at 22, can be distinguished from the balance of the lateral markings 16, preferably by being of heavier nature.

The longitudinal and lateral markings are formed on game board 10 by any convenient or conventional means. When the game board is paper or cardboard, the markings can be printed upon the top surface of the game board. When the game board is of synthetic polymer composition material, the markings can be formed to be raised or depressed below the general surface thereof. Of course, the markings are preferably raised so as to leave the spaces 20 as slightly recessed spaces. In the case of the game board 10 which is to be reusable, when the game board is made of cardboard material or the like, preferably a slick, synthetic coating is provided on the top thereof so that marking of the surface can be easily managed and easily erased. In the case of a game board of a synthetic, polymer composition material, such is normally sufficiently slick that it can be conveniently marked with a grease pencil or china marker, and the markings can be very readily removed for reuse of the game board.

Game board 10 is illustrated as having six columns 14 and six rows 18 to make up a total of 36 spaces 20. However, since the spaces 20 below lowermost lateral marking 22 are used for a different purpose, only the spaces above line 22 will be considered number spaces, while the spaces below line 22 will be considered total spaces. As is seen, the six columns and six rows on game board 10 provide a game board having 30 number spaces and six total spaces. However, this is merely exemplary and any convenient number of columns and rows can be employed. However, it is desirable that the number of columns and rows be equal so that a diagonal of spaces occurs from corner to corner for reasons hereinafter described. Thus, any number of rows and columns is employable but, as will appear hereinafter in the description of the skill involved in the game and the manner in which the game is played, a game board having six columns and six rows is a convenient number to provide a full application of the requirement of skill without the game becoming too difficult and too burdensome, or without the game becoming too long.

Referring to FIG. 2, number means 24, 26 and 28 are shown therein. Number means or tokens 24, 26 and 28 are exemplary of a plurality of number means, the total being equal to the total quantity of number spaces on the game board 10. In the preferred embodiment illustrated in FIG. 1, as previously discussed, game board 10 has 30 number spaces. Accordingly, there are 30 number means of which number means 24 through 28 are exemplary. FIG. 2 further illustrates that the number means are consecutively numbered from one through, in this case, 30 so that there is one number means carrying each number. The number means carry the numbers on the faces thereof, as shown in FIG. 2, and the reverse side is blank and indistinguishable so that, when turned face down, numbers cannot be selected other than by random.

FIG. 3 illustrates random totals number selection means 30. Number selection means 30 comprises base 32 having a spinner 34 thereon which has an indicating pointer 36 on one end thereof. Base 32 has a plurality of number spaces 38, each having a number therein. The number spaces 38 are preferably equiangular around the rotational axis of spinner 34. Thus, as spinner 34 is spun, in the absence of unevenness in the bearing and rubbing of the spinner itself, number spaces 38 will be selected at random. Each of number spaces 38 has a number therein, each of the numbers being different, and for the exemplary 36-space game board of FIG. 1, the numbers consecutively range from number 51 through number 99. For convenience in drafting, a lesser number has been illustrated, but in the actual random number selector, the spaces are the correct number for this purpose.

In order to best explain the manner in which the parts of the skill game cooperate together, the employment of the parts will be described. First, the spinner of the random totals number selection means of FIG. 3 is spun and a random total number is indicated by pointer 36. This number is placed in the total space of the left-hand column 14. The spinner of selection means 30 is spun successive times in order to indicate one total in the fifties, one in the sixties, one in the seventies, one in the eighties, one in the nineties and one of no specification. These totals are not necessarily determined in that order, but are determined in the successive order of the spins of spinner 34. These totals are placed in the total spaces below lowermost lateral marking 22, until each of these spaces is filled. Exemplary, total numbers are shown in the total spaces in FIG. 1.

Next, number means or tokens 24 through 28 are employed. They are positioned face down upon the table and are mixed so that the player has no information as to the number indicated upon each of the means. The player chooses one number means, turns it over and reads the number indicia thereon. The player now selects the number space on the board 10 in which he wishes to place that number. After he writes it in one of the number spaces above line 22, he sets that number means aside. The player chooses the space in which to write the number in accordance with accomplishing a completed game in which each of the number spaces in a column adds down to the total number in the total space at the bottom of that column. Additionally, the diagonal additions through the number spaces desirably total the numbers in the total number corners. Thus, the player plans his game so that he places the numbers in the appropriate number square, in accordance with his planning skill. Next, he chooses another number means, turns it over and writes the number in the appropriate number space. This continues until all of the number means have been used, and each of the number spaces is filled. Thereupon, the player checks his totals against the desired totals and scores the game. Appropriate numbers are shown in the number spaces in FIG. 1, as if the player played a perfect game for maximum score.

Any convenient scoring method can be used, and one preferable scoring method is one wherein the player receives 20 points for each column in which the numbers in the spaces add up to the total at the bottom of the column. He receives 30 points for each diagonal in which the diagonal numbers add up to the total at the end of the diagonal. When the player accomplishes addition to the common total for a column and a diagonal, he receives an additional 10 points. For all columns which do not add up to the total in the bottom total space for that column, the player deducts the difference between the column total and the number in the total space. Thus, a numerical score is achieved for each game. In the perfect game illustrated in FIG. 1 the player receives 20 points for each of the six columns, 30 points for each of the two diagonals and 10 extra points for reaching the bottom corner totals from both directions.

In the method of play described above, the numbers were marked in the number spaces. Alternatively, the number means 24 through 28 can be placed in the appropriate spaces as they are selected and placed. This eliminates the need for erasure after completion of the game. Such practice is especially useful when the game board 10 is formed of synthetic polymer composition material and the number spaces are recessed between raised markings. Such raised markings aid in retaining the number means in place, after each number space has been chosen. FIG. 4 illustrates game board 40 as an example of a game board six columns wide arranged for playing by two players. With critical examination of the game board 40, it is clear that it is the equivalent of two boards 10 which overlap at their tops to the extent of two rows and four columns. The two boards which are equivalent to boards 10 are generally indicated at 42 and 44. Thus, each of the equivalent boards has a number of rows and columns, to define number spaces and total spaces, with the rows and columns preferably being of equal number so that diagonal lines of numbers starting from the upper corners terminate in the total spaces in the lower corners. Again, six columns and five number rows are illustrated, and such are preferable for the normal game. Other numbers of columns and rows can be employed as desired.

The number means of FIG. 2 and the random number selector means of FIG. 3 are employed with the game board 40 to form the game of skill playable by two players, as opponents. The play proceeds quite the same as previously, with slight modifications for the fact that two players are playing with the same totals and the same number means. First, preliminary to the beginning of play, as in the previous game for one person, totals are selected for the total spaces at the bottoms of the columns. The players can alternate spinning of the spinner 34, until the proper totals have been selected, as previously described. Exemplary totals are illustrated in FIG. 4. The four columns common to each player carry the same totals. This is not to say that the totals are in line with each other on opposite ends of the same column, but instead the total spaces at opposite ends of the same columns on the two equivalent boards have different totals, but the same four totals on one equivalent board appear in the same four columns on the other equivalent board, as illustrated. Thus, totals must be mixed so they do not correspond vertically on the two equivalent boards. In the two remaining, noncommon columns, numbers are also selected in the same manner. Thus, both players are playing to the same totals, but arranged in different columns, as shown in the exemplary illustration.

The overlapping number spaces are called conflict spaces, and both players play in these conflict spaces. Since the totals have been placed in the total spaces, now the number means 24 through 28 are individually selected at random, and turned over. The players alternate in turns. The first player drawing the number has a choice of placing the number in one of the conflict spaces, or in one of the nonconflict spaces. If he places the number in one of the conflict spaces, his opponent must place the same number in the same conflict space. However, if the player drawing the number means plays it in a nonconflict space, his opponent can only play it in a nonconflict space, but can play it in any one of his own nonconflict spaces. The game, thus, continues with players taking alternate turns until all of the number means are drawn and all of the spaces are filled, as shown by the exemplary game illustrated in FIG. 4. Upon completion, the columns are added to determine whether or not they reach the desired total number, and the diagonals are similarly added. The same scoring rules apply. The player of the exemplary game of FIG. 4 on equivalent board 44 scored the diagonal 57 and columns 78, 84, 96 and 90, less two points, which is the difference between the actual totals and desired totals in the first two columns, for a score of 108 points. The player on the equivalent board 42 scored both diagonals, the right-hand four columns and an extra 10 points for reaching the 90 total from both ways. However, he must deduct two points for each of the left two columns, for a total score of 146 points. The latter player is the winner. In this game, it can be seen that the conflict spaces serve as means for destroying the opponent's strategy in the placement of his numbers. Thus, the conflict squares can aid the player's strategy while it is hindering his opponent's.

Figure 5:
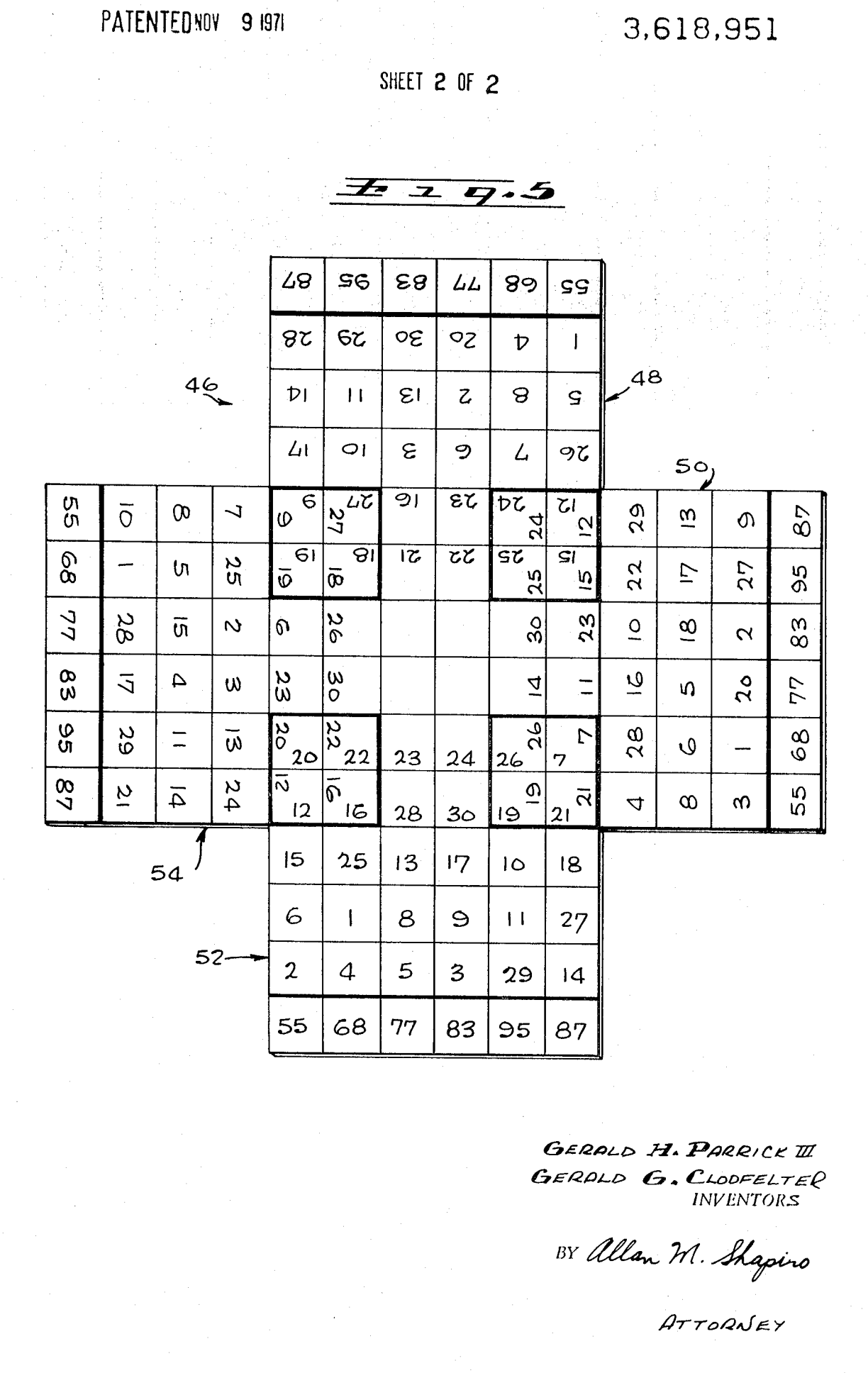

Referring to FIG. 5, game board 46 is shown therein. Game board 46 is formed of four equivalent boards 48, 50, 52 and 54, each of which is the equivalent of game board 10. The game board 46 is employed with the number means 24 through 28 and the random number selector 30 to form a game of skill playable by four players. Again, each of the equivalent boards is identical in character to the game board 10. In the preferred embodiment, there are six columns in each of the equivalent boards, together with five number rows and one total row to make boards of square configuration. Similarly to the game board of FIG. 4, the equivalent boards of game board 46 are overlapped. As is seen in FIG. 5, the four upper corner squares are shared with the equivalent boards on each side. Thus, each player plays a full 30 spaces of numbers, but shares the play of eight conflicting spaces with the adjacent equivalent boards.

In use in the game of skill, six total numbers are chosen, and these are arranged so that the totals on the equivalent boards are not in line, as illustrated in the exemplary game. This can be accomplished by arranging the totals in the same left-to-right order on each board, as viewed by the player of each equivalent board. After the totals are marked in the total spaces, the players, one at a time and in clockwise turns, choose number means, and determine where the number indicated on that number means will be placed on his board. If he chooses to to place it in a nonconflict space, each of the other players must place that number in one of his own nonconflict spaces. If he chooses to place it in a conflict space, the player with whom he conflicts must place the same number in the same space. However, the other players in clockwise turns are each free to place the number as they wish as long as no conflict situation arises. This continues until all of the number means have been employed, and all of the number spaces have numbers therein. Thereupon, the columns are added to determine whether or not they add up to the total in the total space at the bottom of the column. Scoring may be accomplished in the same manner as in the individual game.

In the exemplary game shown played on the board in FIG. 5, the player on equivalent board 50 earned 138 points by reaching the diagonal totals as well as the columns totaling 55, 68, 83 and 87. On the remaining columns he missed the correct totals by 22 points. The player on equivalent board 52 reached a perfect game of 200 points by reaching all of the desired totals. The player on equivalent board 54 earned 95 points by reaching the diagonal total to 55 and reaching the columnar totals to 68, 77, 95 and 87. Deducted from this are the 12 points for the missed columnar totals. The missing of a diagonal is not deducted. The player on equivalent board 48 reached a score of 142 points by reaching both diagonal totals and the 68, 83, 95 and 87. He missed by eight points on the other two columns. Spatially opposite players may play as partners.

This invention having been described in its preferred embodiment, it is clear that it is susceptible to numerous modifications and embodiments within the ability of those skilled in the art. For example, other numbers of rows and columns than six can be employed, although a square board is preferred. Similarly, number means and random number selection means of various types can be employed.

What is claimed is:

1. Apparatus for playing a game of skill, said game of skill being played upon a game board, said game board comprising:
a top surface, marking means on said top surface to delineate said game board into a plurality of rows and columns, the number of rows equaling the number of columns, said marking means thus delineating a number of spaces on said game board, the number of spaces equaling the product of the number of rows and the number of columns, the marking means separating the two lowermost rows being distinctive from the other marking means, so that the bottom space in each column is distinctively marked; and
a plurality of number tokens, each of said number tokens having a different number thereon, the total number of number tokens being equal to the total number of rows minus one times the total number of columns on said game board, so that there is one number token for each space above said distinctive marking means.

2. The apparatus of claim 1 wherein said number tokens carry successive whole numbers thereon increasing from number one.

3. The apparatus of claim 2 further including random number selection means carrying numbers other than those on said number tokens for selecting numbers at random and which are sufficiently large to be usable as column totals for marking in the spaces on said board below said distinctive marking means.

4. The apparatus of claim 3 wherein said random number selection means carries numbers thereon higher than the highest number on said number tokens so that the number marked in a space below said distinctive marking means is larger than the number on any of said number tokens.

5. The apparatus of claim 1 further including random number selection means whereby random numbers can be selected for marking in the spaces on said board below said distinctive marking means.

6. The apparatus of claim 5 wherein said random number selection means carries numbers thereon higher than the highest number on said number tokens so that the number marked in a space below said distinctive marking means is larger than the number on any of said number tokens.

7. The apparatus of claim 1 wherein said game board comprises first and second game boards having a plurality but not all of said columns overlapping and having a plurality but not all of said rows overlapping so that, as players play upon the game boards, they play on some spaces which are in common to the adjoining game board.

8. The apparatus of claim 1 wherein said number tokens carry successive whole numbers thereon increasing from number one.

9. The apparatus of claim 7 further including random number selection means carrying numbers other than those on said number tokens for selecting numbers at random and which are sufficiently large to be usable as column totals for marking in the spaces on said board below said distinctive marking means.

10. The apparatus of claim 7 further including random number selection means carrying numbers thereon higher than the highest number on said number tokens so that the number marked in the spaces below said distinctive marking means is larger than the number on any of said number tokens.

11. The apparatus of claim 7 wherein said game board comprises first, second, third, and fourth game boards each having a plurality but not all of said columns overlapping with an adjacent game board and having a plurality but not all of said rows overlapping with an adjacent game board so that, as players play on the first, second, third, and fourth game boards, they play on some spaces which are in common to an adjoining game board.

12. The apparatus of claim 11 wherein said number tokens carry successive whole numbers thereon increasing from number one.

13. The apparatus of claim 11 further including random number selection means for the selection of random numbers for marking in the spaces on said board below said distinctive marking means.

14. The apparatus of claim 13 wherein said random number selection means carries numbers thereon higher than the highest number on said number tokens so that the number marked in the spaces below said distinctive marking means is larger than the number on any of said number tokens.

15. Apparatus for playing a game of skill, said game of skill being played upon a game board, said game board comprising:

a top surface, marking means for delineating said game board on its top surface into a plurality of rows and columns, said marking means thus delineating a number of spaces on said game board, the number of spaces equaling the product of the number of rows and the number of columns, the marking means separating the two lowermost rows being distinctive from the other marking means so that the bottom space of each column is distinctively marked;

said game further employing a plurality of number tokens, each of said number tokens having a different number thereon, said numbers being successive whole numbers and increasing from number one, the total number of number tokens being equal to the total number of rows minus one times the total number of columns on said game board so that there is one number token for each space above said distinctive marking means; and random number selection means for selecting numbers at random, said random number selection means carrying numbers which are sufficiently large to be usable for column totals and being higher than the highest number on said number tokens for marking in the spaces on said board below said distinctive marking means.

* * * * *